United States Patent [19]

Smolik

[11] Patent Number: 4,497,416

[45] Date of Patent: * Feb. 5, 1985

[54] ELECTRICAL RECEPTACLE BOX ASSEMBLY

[76] Inventor: Robert A. Smolik, 670 W. Seventh St., St. Paul, Minn. 55102

[*] Notice: The portion of the term of this patent subsequent to Sep. 13, 2000 has been disclaimed.

[21] Appl. No.: 507,098

[22] Filed: Jun. 23, 1983

Related U.S. Application Data

[63] Continuation-in-part of Ser. No. 399,473, Jul. 19, 1982, Pat. No. 4,403,708.

[51] Int. Cl.³ .............................................. H02G 3/10
[52] U.S. Cl. ....................................... 220/3.5; 220/3.9; 248/DIG. 6
[58] Field of Search ...................... 174/58; 220/3.2, 3.3, 220/3.4, 3.5, 3.6, 3.9; 248/218.4, 220.2, DIG. 6

[56] References Cited

U.S. PATENT DOCUMENTS

| | | | |
|---|---|---|---|
| 1,725,293 | 8/1929 | Morgenstern | 220/3.4 |
| 2,265,957 | 12/1941 | Tinnerman | 24/295 |
| 2,299,674 | 10/1942 | Austin, Jr. | 220/3.9 X |
| 2,973,175 | 2/1961 | Appleton | 248/DIG. 6 X |
| 3,376,005 | 4/1968 | Swanquist | 220/3.9 X |
| 3,428,284 | 2/1969 | Trachtenberg et al. | 248/DIG. 6 X |
| 3,491,974 | 1/1970 | Swanquist | 248/DIG. 6 X |
| 3,606,223 | 9/1971 | Havener | 248/DIG. 6 X |
| 3,730,466 | 5/1973 | Swanquist | 248/DIG. 6 X |
| 3,780,209 | 12/1973 | Schuplin | 248/DIG. 6 X |
| 3,972,498 | 8/1976 | Paskert | 220/3.9 X |
| 3,977,640 | 8/1976 | Arnold et al. | 220/3.9 X |
| 4,229,614 | 10/1980 | Smolik | 174/58 |
| 4,403,708 | 9/1983 | Smolik | 220/3.3 X |

OTHER PUBLICATIONS

Enrico Products Catalog; Cleveland, Ohio; 1973.

Primary Examiner—Stephen Marcus
Assistant Examiner—Robert Petrik
Attorney, Agent, or Firm—Burd, Bartz & Gutenkauf

[57] ABSTRACT

An electrical receptacle box particularly adapted for mounting to a metal wall stud prepared with a plurality of holes on the major side thereof arranged in ordered patterns at preferred installation locations of receptacle boxes. The electrical receptacle box includes a housing with a front opening and an interior volume for housing an electrical receptacle. A plurality of resilient tines are fixed in parallel relationship at one end to a side wall of the box housing and extend perpendicularly away from the side wall. The tines are arranged to describe a pattern generally corresponding to the hole pattern on the wall stud but can be slightly deviant from the pattern such that the tines fit in the holes of a selected hole pattern deflected under slight spring tension. The tines can have notches to engage the edges of the holes.

24 Claims, 13 Drawing Figures

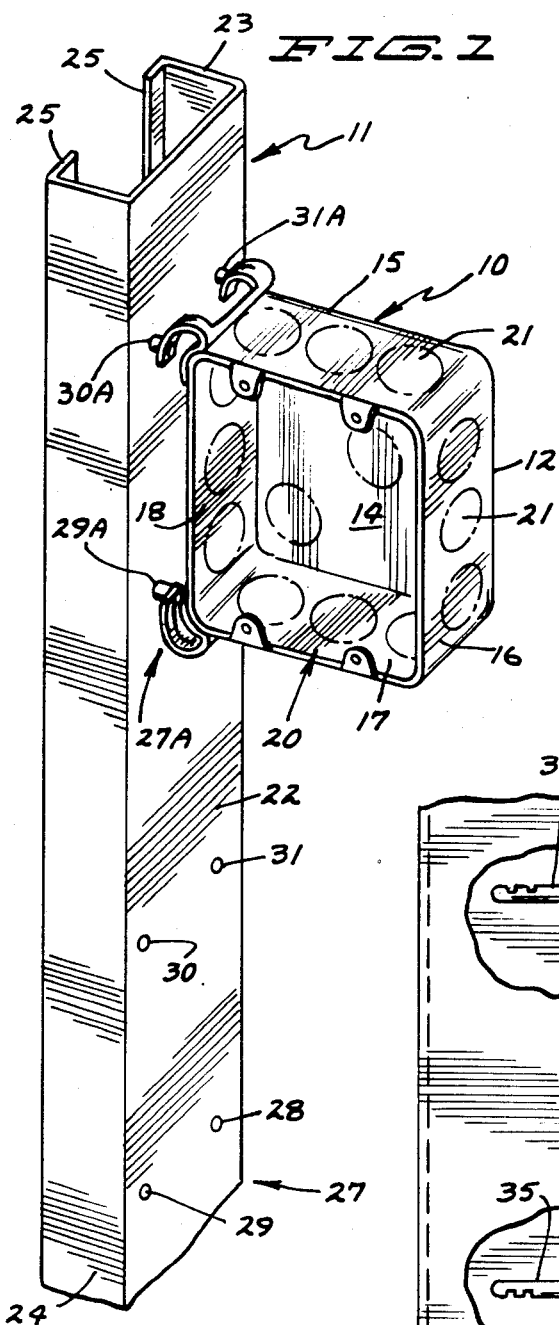
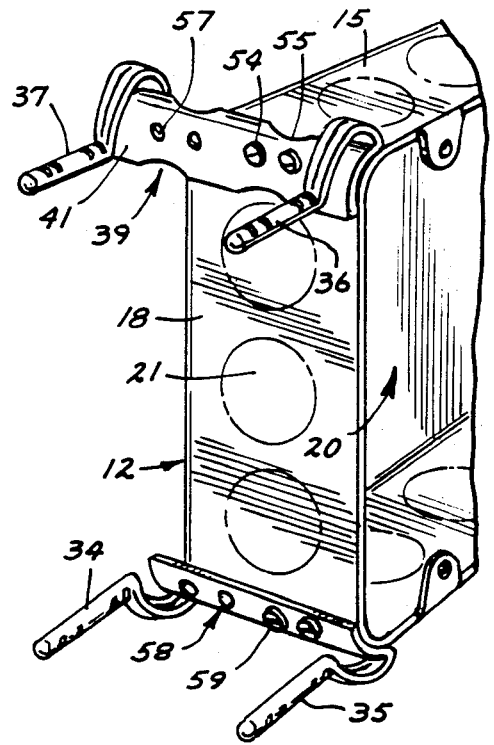
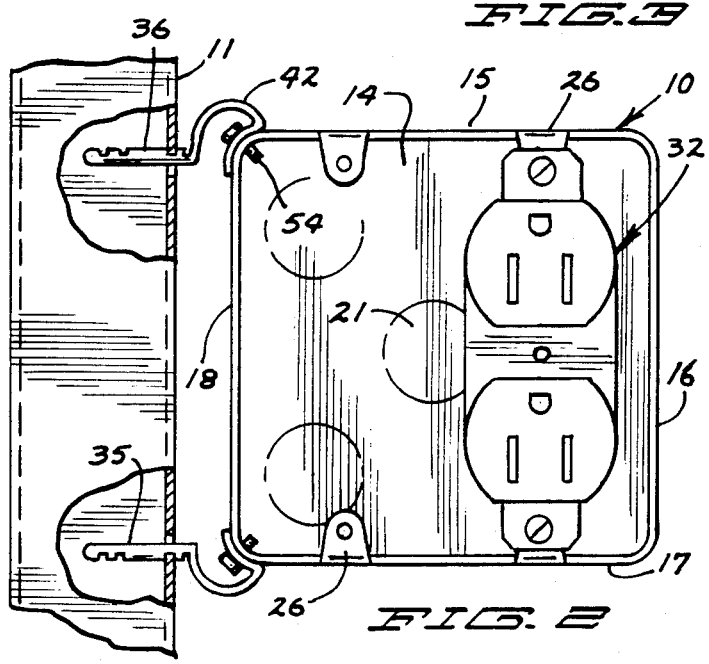
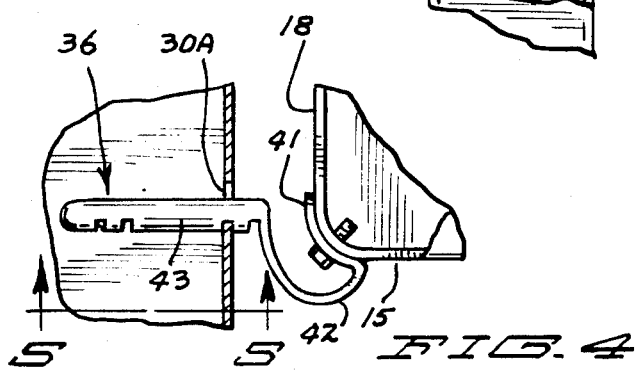
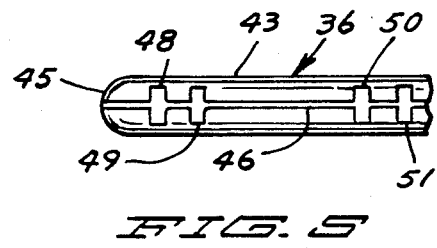

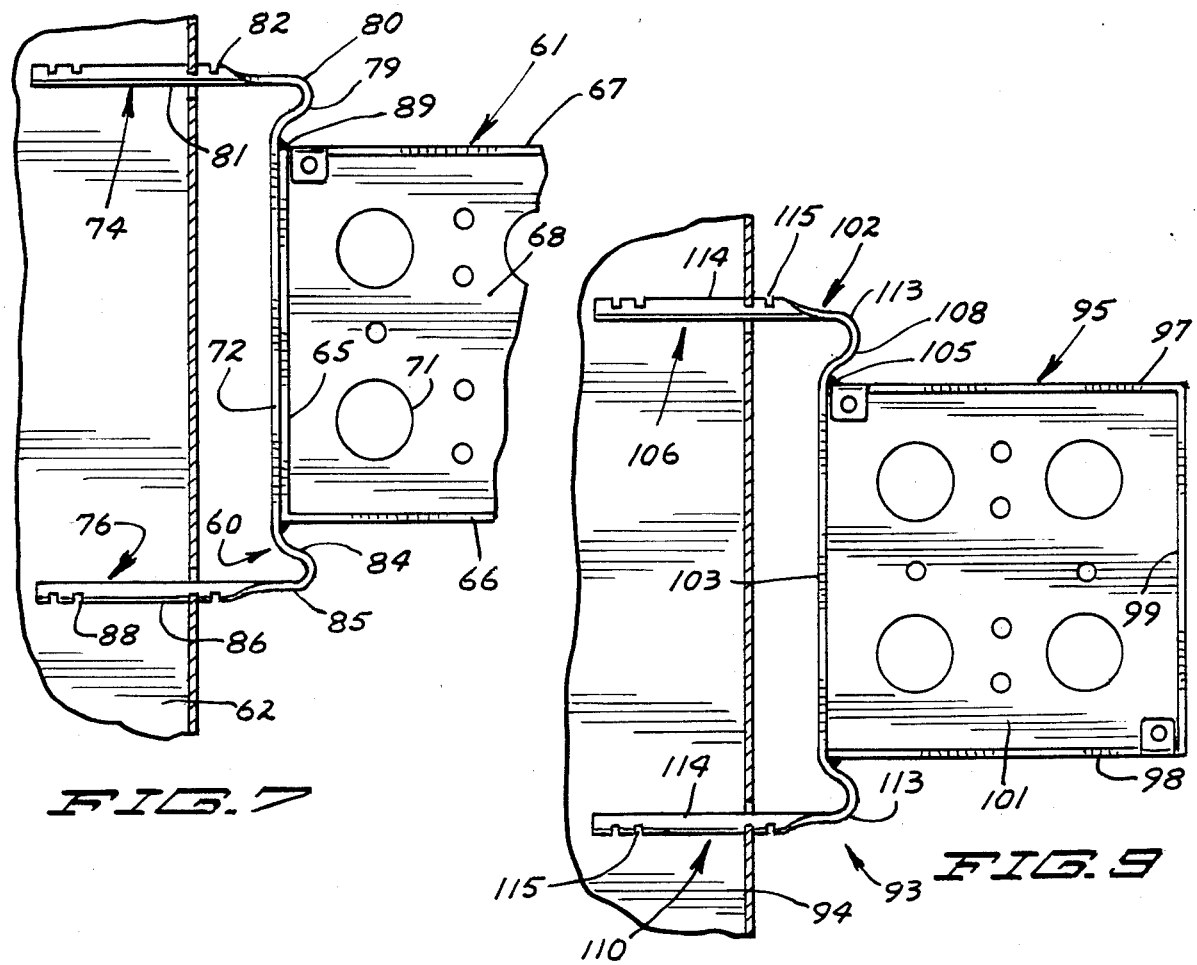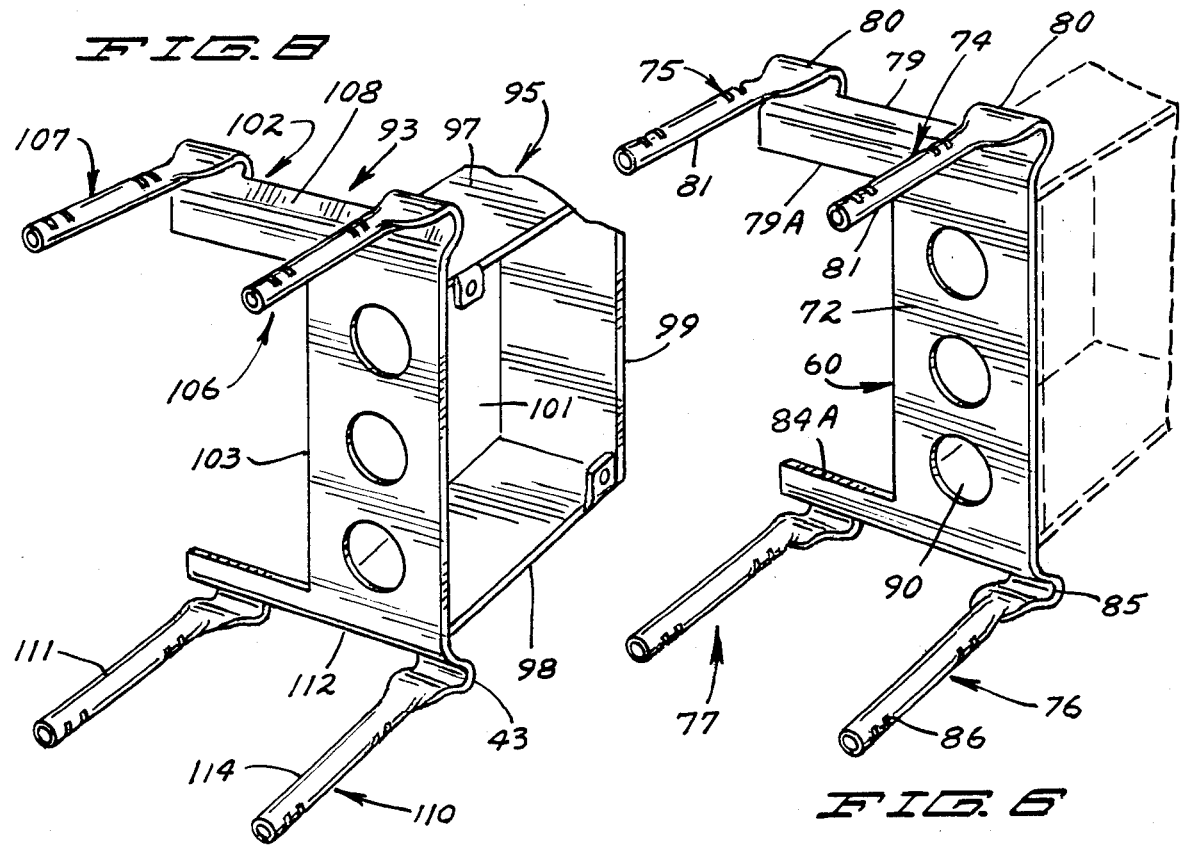

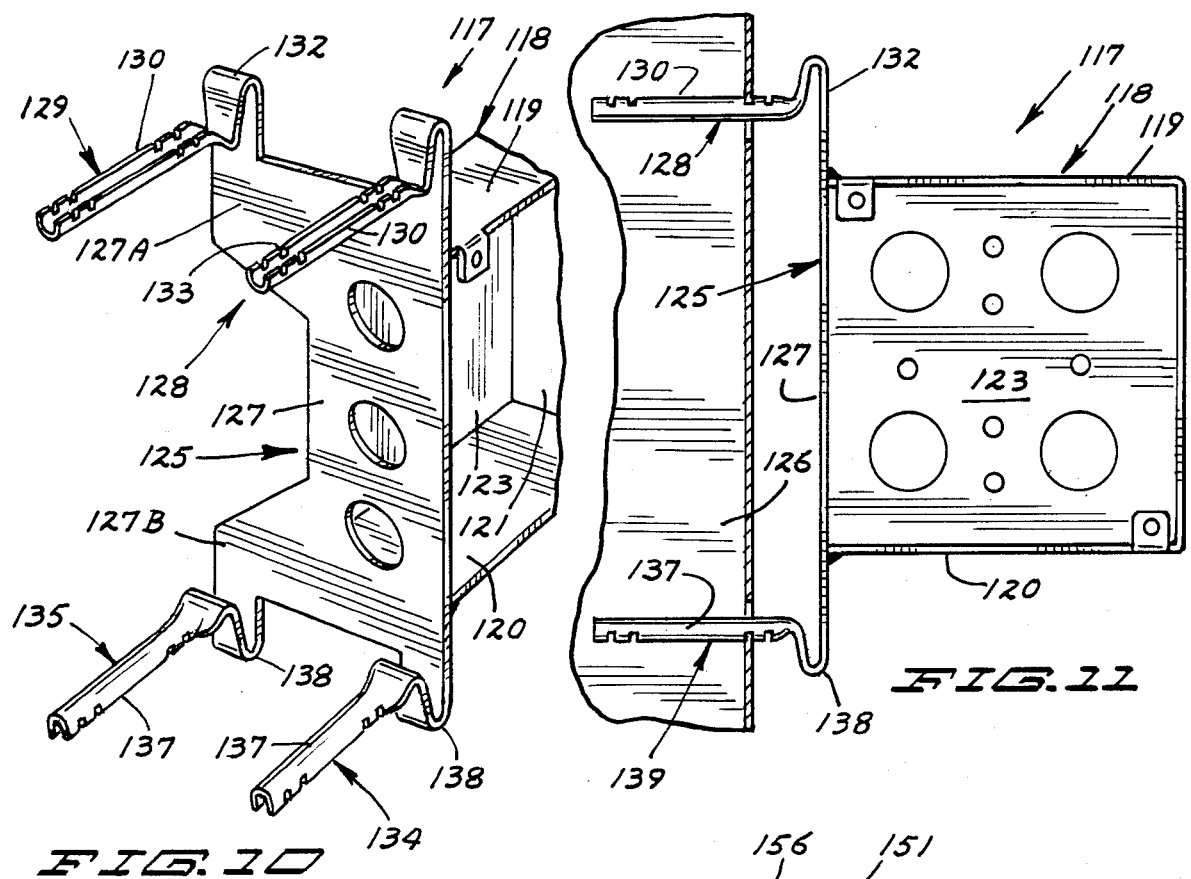
FIG. 10
FIG. 11
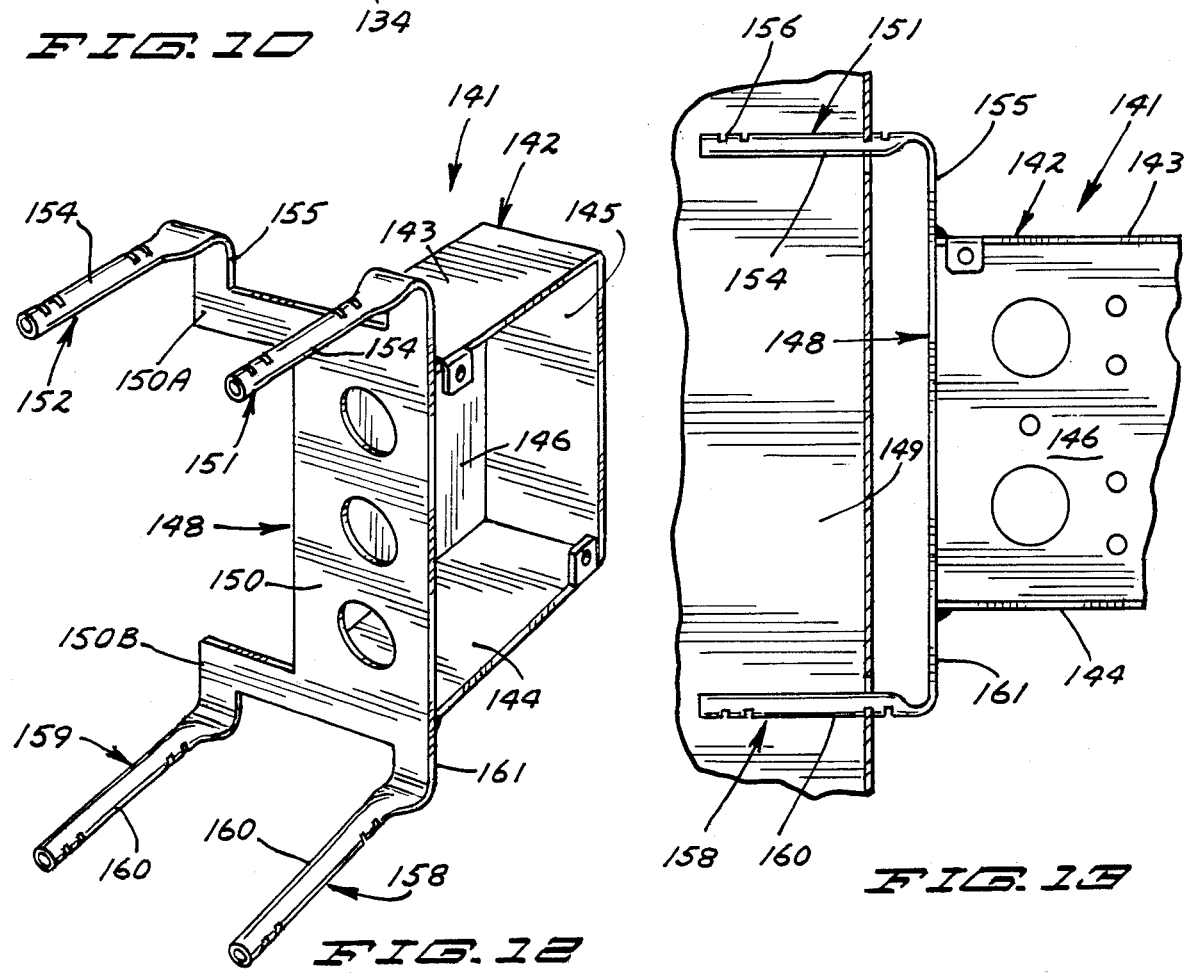
FIG. 12
FIG. 13

ELECTRICAL RECEPTACLE BOX ASSEMBLY

CROSS REFERENCE TO RELATED APPLICATION

This application is a continuation-in-part of U.S. application Ser. No. 399,473 for ELECTRICAL RECEPTACLE BOX ASSEMBLY filed July 19, 1982, U.S. Pat. No. 4,403,708.

BACKGROUND OF THE INVENTION

The invention relates to the field of electrical receptacle boxes of the type mounted on a wall stud to hold an electrical receptacle such as an outlet or a switch or the like. In particular, the invention relates to such a receptacle box for mounting on a metal wall stud.

Metal wall studs find increasing use in commercial and residential construction because of superior durability and longevity characteristics. However, mounting electrical receptacle boxes to them presents special problems because they are not as readily penetrable as wood by usual fasteners. For purposes of economy, especially when constructing a commercial building, it is desirable to mount the receptacle box to the wall stud as efficiently as is practical. In the prior art, clips are used which have a clamp portion which is forcefully fitted to an edge of the box. Another portion of the clip is fastened to the front of the metal stud either by another spring clamp or by a screw. In either case, this portion is covered by wall board and presents a bulge that must be considered. Such installation is time consuming and does not mount the receptacle box in as sturdy a fashion as desirable.

SUMMARY OF THE INVENTION

The present invention comprises an electrical receptacle box particularly adapted for mounting to a metal wall stud. A metal wall stud intended for installation in a generally upright orientation in building construction is prepared with a plurality of holes on the major side thereof arranged in ordered patterns located at designated heights on the wall stud according to preferred installation locations of receptacle boxes. The electrical receptacle box includes a back wall and side walls defining a front opening and an interior volume for housing an electrical receptacle to be accessible at the front opening. A plurality of resilient prongs or tines are fixed in parallel relationship at one end to a side wall of the box housing and extend perpendicularly away from the side wall. The tines are arranged to describe a pattern generally corresponding to the hole pattern on the wall stud but can be slightly deviant from the pattern such that the tines fit in the holes of a selected hole pattern deflected under slight spring tension. The spring tension holds the tines with respect to the holes to hold the box housing in the desired position. The tines can have notches to engage the edges of the holes.

IN THE DRAWINGS

FIG. 1 is a perspective view of an electrical receptacle box according to the invention installed on a metal wall stud;

FIG. 2 is an enlarged front elevational view of the receptacle box of FIG. 1 installed on a wall stud with portions removed for purposes of illustration;

FIG. 3 is a perspective view of a portion of the electrical receptacle box of FIG. 1 removed from the wall stud for purposes of illustration;

FIG. 4 is an enlarged view of a corner portion of the electrical receptacle box shown in FIG. 2;

FIG. 5 is an enlarged view of a tine of FIG. 4 taken along the line 5—5 thereof;

FIG. 6 is a perspective view of a mounting bracket for an electrical receptacle box assembly according to a second form of the invention;

FIG. 7 is a side elevational view of a mounting bracket of FIG. 6 fixed to an electrical receptacle box housing shown partly broken away and installed on a wall stud;

FIG. 8 is a perspective view of an electrical receptacle box assembly according to a third form of the invention;

FIG. 9 is a side elevational view of the electrical receptacle box assembly of FIG. 8 installed on a wall stud;

FIG. 10 is a perspective view of an electrical receptacle box assembly according to a fourth form of the invention shown partly broken away;

FIG. 11 is a side elevational view of the electrical receptacle box assembly of FIG. 10 installed on a wall stud;

FIG. 12 is a perspective view of an electrical receptacle box assembly according to a fifth form of the invention; and FIG. 13 is a side elevational view of the electrical receptacle box assembly of FIG. 12 shown partly broken away and installed on a wall stud.

DESCRIPTION OF PREFERRED EMBODIMENTS

Referring to the drawings, there is shown in FIGS. 1 and 2 an electrical receptacle box according to the invention indicated generally at 10 mounted on a metal wall stud 11 of the type used in building construction. Electrical receptacle box 10 includes a housing 12 formed of a back wall 14 and perpendicularly orientated side walls 15, 16, 17 and 18 defining a front opening 20 and an interior volume for accommodation of an electrical receptacle such as a switch, outlet or the like that can be mounted on bosses 26 as electrical socket 32 shown in FIG. 2. The rear wall and side walls have a plurality of conventional knock-out members 21 for access to the interior of housing 12 from the sides and back for wiring, conduit or the like.

Wall stud 11 has a major side member 22 and perpendicular end members 23, 24 as well as inwardly turned flanges 25. The major side member 22 of wall stud 11 is prepared with a plurality of uniform sets of mounting holes describing hole patterns located at spaced intervals on wall stud 11 for mounting housing 12. A pattern of holes 27 is shown to include first, second, third and fourth holes 28–31 describing a rectangular configuration. Patterns 27 of holes can be longitudinally arranged at specific elevations on stud 11. A lower set of holes can be positioned at an elevation to mount a receptacle box to house a standard wall plug. Intermediate sets of holes can be positioned at an elevation to mount a counter height wall plug receptacle and at an elevation to mount a standard light switch receptacle box. Other sets of holes can be vertically spaced to be positioned at standard elevations to mount other receptacle boxes. Alternatively, mounting holes can be positioned continuously along the major side member 22 of wall stud 11 at regular intervals for practically universal mounting of the electrical receptacle box.

A plurality of parallel resilient prongs or tines are fastened to housing 12 and extend therefrom in spaced relationship generally describing the configuration of the hole patterns on stud 11. Tines 34 through 37 are fixed to housing 12 and extend away in perpendicular relationship to side wall 18 and in a horizontal direction when receptacle box 10 is in an upright orientation in preparation for mounting on a wall stud. Tines 34–37 are arranged in a rectangular pattern corresponding to the hole pattern 27 wherein tines 34–37 are insertable in holes 28–31 to mount box 10 on wall stud 11. The pattern formed by the tips of tines 34–37 corresponds generally to the pattern 27 of holes 28–31 but can deviate slightly from it whereby the tines 34–37 are deflected slightly in order to insert them into the holes and thus seat in the holes under a slight spring tension. For example, the rectangular pattern formed by the tines 34–37 can be slightly larger than the pattern formed by the holes 28–31. The tines are resiliently deflected inward in order to fit them into the holes and are accordingly under a slight spring tension to assist in maintaining them seated in the holes.

Upper tines 36, 37 are part of a bracket 39 installed on the corner of housing 12 formed at the intersection of side walls 15, 18. Bracket has an elongate base 41 with an inside surface conformed to fit the contour of the corner at the intersection of the side walls. One end of base 41 is flush with front opening 20 of housing 12. The other end extends beyond rear wall 14 to permit symmetrical mounting on stud 11.

Tines 36, 37 are formed at the lateral ends of base 41. As shown in FIG. 4, tine 36 extends from the distal edge of base 41 and has a reverse curve bending around over base 41 forming a flexure arm or spring loop 42 which extends to a straight or linear tine section 43. Spring loop 42 permits resilient movement of the straight section 43 of tine 36. Tine 36 is formed from a flat section fo metal extended from base 41 bent around to form spring loop 42 and rolled together to form tubular linear tine section 43 and the outer portion of spring loop 42. As shown in FIG. 5, the tip 45 of linear tine section 43 is rounded to facilitate insertion into a mounting hole. As a result of the rolling procedure, an elongate slot 46 is formed extending the length of tine section 43. Slot 46 permits limited compression of the diameter of tine section 43.

Referring again to FIG. 5, linear section 43 of tine 36 has a plurality of transverse notches located on the periphery thereof for engagement of the edge of a mounting hole. An outer pair of notches 48, 49 is located toward the tip 45 of tine 36, and a second or inner pair of notches 50, 51 is located further rearward. As shown in FIG. 4, the notch 50 is engaged with the edge of a mounting hole 30A with tine 36 installed therein. This secures installation of the tine with respect to the mounting hole. Tine 36 can be in slight spring tension as earlier described to bias notch 50 in engagement with the edge of hole 30A. Forward notches 48, 49 are used when the receptacle box 10 is to be mounted in relatively spaced relationship from wall stud 11. The inward notches 50, 51 are used when the receptacle box 10 is to be mounted in relatively closer relationship to the wall stud 11. The notches face outwardly of the hole pattern. The remaining tines 34, 35, 37 are constructed in identical fashion of the tine 36 and have like forward and rearward notches. The purpose of pairs of notches is to permit angular adjustment of the housing 12 upon installation on wall stud 11 in the event the wall stud 11 should be slightly askew. For example, the tine can be installed in mounting holes with the edges of the holes engaging notch 50 and the corresponding notches on the other tines. Should the wall stud be slightly askew, one or more of the tines can be adjusted whereby the hole edge engages the rearward notch 51 of the pair to compensate and angularly orientate the front opening 20 of the housing 12 so that it will be flush with side member 24 of wall stud 11 for subsequent installation of wall board.

As shown in FIG. 3, mounting screws 54 passing through suitable openings in the base 41 (not shown) mount the bracket 39 to the housing 12. Other mounting means could be provided such as rivets, welding or the like. Arcuate cut outs 55 are provided in base 41 to permit access to the adjacent knock-out members 21. Second screw holes 57 are provided on base 41 in symmetrical relationship to the holes accommodating screws 54 so that bracket 39 may be used on other corners of housing 12. Mounting holes 28–31 are symmetrically disposed on the surface of side member 22 so that box 10 can be mounted with front opening 20 facing in either direction.

Lower bracket 58 carrying the lower tines 34, 35 is constructed in identical fashion to the upper bracket 39 and is fastened to the corner of housing 12 located at the intersection of side walls 17, 18 by suitable screws 59.

In use and in terms of a method, tines 34–37 are provided on receptacle box 10 defining a pattern slightly larger than the hole pattern 27A defined by holes 29A–31A provided on an intended installation site on wall stud 11. The tine ends are given a slight spring deflection and the tines are inserted in the corresponding mounting holes to an extent where a forward notch of one of the pairs of notches engages the hole edge. The receptacle box 10 is then securely installed with respect to wall stud 11 as shown in FIGS. 1 and 2, and an electrical receptacle can now be installed thereon. If the wall stud 11 is slightly askew, or is slightly inclined, or is thicker at one end than the other, the positioning of the box is adjusted through the use of the rear notch of the notch pairs at one or more tines. The tines are held in the respective mounting holes under a slight spring tension.

Referring to FIGS. 6 and 7, there is shown a second form of electrical receptacle box assembly according to the invention including a bracket 60 for mounting an electrical receptacle box housing 61 to a metal wall stud 62. Housing 61 includes parallel vertical side walls, one of which is shown at 65, and parallel horizontal side walls 66, 67 connected to a back wall 68 with an open front for mounting electrical receptacles on mounting ears 70. Knock-out members 71 are provided so that wiring, conduit or the like can be brought into housing 61.

Bracket 60 includes an elongate, flat plate-like intermediate base 72 having a width generally corresponding to the width of a side wall 65 of housing 61, and a height at least equal to that of the housing side wall. Bracket 60 also carries a plurality of generally parallel resilient tines 74–77 extended in perpendicular relationship from base 72. Tines 74–77 are arranged with tips in a rectangular pattern corresponding to a hole pattern formed in the metal wall stud 62 like that hole pattern illustrated in FIG. 1. The pattern formed by the tips of the tines 74–77 corresponds generally to the hole pattern but can deviate slightly from it whereby the tines are deflected slightly for insertion into the holes and thus seat in the holes under a slight spring tension.

A first shoulder 79 extends from a first longitudinal end of base 72 and curves rearwardly. Shoulder 79 also extends laterally away from one side of base 72 as at 79A. First and second tines 74, 75 extend from lateral ends of shoulder 79. First tine 74 has a flexure arm comprised as a reverse curve bending around over shoulder 79 forming a spring loop 80 which extends to a straight or linear tine portion 81. Spring loop 80 permits resilient movement of the linear tine portion 81 of tine 74. Tine 74 is formed from a flat section of metal extended from shoulder 79 bent around to form spring loop 80 and rolled together to form the tubular linear tine portion 81. Tine 74 could have other flexure arm or spring loop configurations and could be formed other than by rolling a flat metal portion. Second tine 75 likewise has a spring loop portion 80 extended from shoulder 79, and a linear tine portion 81. The linear portion 81 of first and second tines 74, 75 have a plurality of transverse notches 82 located on the periphery thereof for engagement of the edge of a mounting hole as previously described with respect to FIGS. 4 and 5.

A second shoulder 84 extends from the second or opposite longitudinal end of base 72 and curves rearwardly. Second shoulder 84 is laterally extended from the side of base 72, as at 84A, in symmetrical relationship to shoulder 79. Second shoulder 84 carries third and fourth tines 76, 77. Each has a spring loop portion 85 which comprises a reverse curve bending around over the shoulder 84 and extending to a straight or linear tine portion 86. Likewise, notches 88 can be provided for engagement with the edge of a hole. The third and fourth tines 76, 77 are symmetrical and identical in construction to the first and second tines 74, 75.

As shown in FIG. 7 a side wall 65 of housing 61 is fixed to the base 72 of bracket 60 by suitable means such as welds 89. The tines 74-77 can be inserted in the holes of a pattern provided on metal stud 62 to securely mount housing 61 thereon with its front opening in flush relationship to the front surface of the metal stud preparatory to mounting an electrical receptacle and installing wallboard. A plurality of holes or openings 90 can be provided in base 72 to coincide with knock-out openings provided in side wall 65 (not shown) to provide access for conduit or the like. The shoulders 79, 84 have the laterally offset portions 79A, 84A in order that bracket 60 can be mounted on stud 62 facing either direction with the front opening of housing 61 flush to the stud surface. The length or height of base 72 can be greater than the height of side wall 65 whereby in the manufacture of the electrical receptacle box assembly, receptacle boxes of different sizes can be fixed to the base 72. In addition, housing 61 can be constructed of a material of less than normal rigidity as the base 72 of bracket 60 serves to stabilize the housing in mounting it with respect to the wall stud 62.

Referring to FIGS. 8 and 9, there is shown an electrical receptacle box assembly according to a third form of the invention indicated generally at 93 mounted on a metal wall stud 94. The electrical receptacle box assembly 93 includes a housing 95 comprised of top and bottom horizontal side walls 97, 98, a vertical side wall 99 all connected to a back wall 101. A mounting bracket 102 has an elongate, flat intermediate base 103. Base 103 is connected to the ends of horizontal side walls 97, 98 of housing 95 opposite the vertical side wall 99 and is comprised as a second vertical side wall of housing 95 or an integral part of housing 95. The width of base 103 corresponds to the width of a side wall, and the height of base 103 is at least equal to that of a side wall. Base 103 is connected to the ends of horizontal side walls 97, 98 by suitable means such as welds 105.

Mounting bracket 102 is otherwise identical to the mounting bracket 60 described with respect to FIGS. 6 and 7. Mounting bracket 102 has first and second tines 106, 107 extended from a shoulder 108 which curves rearwardly from base 103. Shoulder 108 is laterally extended from base 103. Third and fourth tines 110, 111 extend from a lower reverse curved shoulder 112. Each tine is comprised of a spring loop portion 113 extended from the respective shoulders, and a linear tine portion 114. The tines have notches 115 for engagement of the edges of a mounting hole of a pattern of holes provided in metal wall stud 94. The tips of the tines correspond generally to the hole pattern but can deviate slightly therefrom so as to be mountable in the hole pattern under slight spring deflection.

Referring to FIGS. 10 and 11, there is shown an electrical receptacle box assembly according to a fourth form of the invention indicated generally at 117, wherein the mounting tines have spring loop portions according to an example of an alternative configuration. Assembly 117 includes a housing 118 comprised of top and bottom horizontal side walls 119, 120 and a vertical side wall 121 all connected to a back wall 123. A mounting bracket 125 mounts housing 118 to a metal wall stud 126. Mounting bracket 125 has an elongate, flat intermediate base 127 connected to the ends of the horizontal housing walls 119, 120 opposite vertical wall 121 to form a second vertical side wall of housing 118. Base 127 corresponds in width and height to a side wall of housing 118 and is connected by suitable means such as welding.

An upper or first longitudinal end of base 127 carries first and second tines 128, 129. Tine 128 has a linear tine portion 130 and a flexure arm comprised as a spring loop 132. Spring loop 132 has a portion extended linerly from base 127 to an inverted U-shaped portion extending to linear tine portion 130. As shown in FIG. 10, linear tine portion 130 is comprised of a flat metal member formed into a U-shape. Notches 133 are provided for engagement of a hole edge. Second tine 129 is positioned on a laterally extended shoulder 127A extended from base 127 and also has a linear tine portion 131 and a spring loop 132 comprised as a portion linearly extended from the shoulder 127A and an inverted U-shaped portion leading to the linear tine portion.

Third and fourth tines 134, 135 are located at the lower or second longitudinal end of base 127 with fourth tine 135 situated on a laterally offset shoulder portion 127B in symmetrical relationship to the upper shoulder portion 127A. Third and fourth tines 134, 135 have linear tine sections 137 and flexure arms comprised as spring loops 138. The linear tine sections of the tines 128, 129, 134, 135 are in generally parallel relationship with the tips spaced apart to correspond generally to the hole pattern provided on the metal wall stud 126, but can be slightly deviant therefrom so as to be mountable in the hole pattern under slight spring deflection.

Referring to FIGS. 12 and 13, there is shown an electrical receptacle box assembly according to a fifth form of the invention indicated generally at 141. Assembly 141 includes a housing 142 comprised of top and bottom horizontal side walls 143, 144 and a vertical side wall 145, all connected to a back wall 146. A mounting bracket 148 mounts the housing 142 to an upright metal wall stud 149. Mounting bracket 148 has an elongate, flat intermediate base 150 connected to the ends of horizontal housing walls 143, 144 opposite vertical wall 145 to form a second vertical side wall of housing 142. An upper longitudinal end of base 150 carries first and second tines 151, 152. Tine 151 has a generally linear tine portion 154 and a flexure arm comprised as a linear flexure member 155 disposed in substantially perpendicular relationship to linear tine portion 154. Flexure member 155 extends longitudinally away from base 150 in coplanar fashion as an integral extension thereof. Linear tine portion 154 extends perpendicularly away from flexure member 155 in a direction opposite housing 142. Flexure member 155 is resilient and permits deflection of the tip of linear tine portion 154 as may be needed for insertion into one of a pattern of holes. Second tine 152 is located on a laterally offset shoulder 150A of base 150 and in like fashion has a linear tine portion 154 connected to a flexure member 155 extended upwardly from the shoulder portion 150A of base 150. Notches 156 are provided for engagement of the edge of a mounting hole.

Third and fourth tines 158, 159 are located at the lower or second longitudinal end of base 150 with fourth tine 159 situated on a laterally offset shoulder portion 150B in symmetrical relationship to the upper shoulder portion 150A. Third and fourth tines 158, 159 have linear tine portions 160 connected in perpendicular relationship to flexure members 161. The tips of the linear tine portions are spaced apart to correspond generally to a hole pattern provided in the metal wall stud 149 and slightly deviant therefrom so as to be mountable in the hole pattern under slight spring deflection.

While there has been shown and described certain preferred embodiments of the invention, it will be apparent that deviations and changes can be had from the embodiment shown without departing from the scope and spirit of the invention. The various electrical receptacle box assemblies have been shown in mounted relationship to upright wall studs; however, it is apparent that they could also be mounted to a horizontally disposed wall stud, such as one spanning a ceiling area for holding of a ceiling fixture.

The embodiments of the invention in which an exclusive property or privilege is claimed are defined as follows:

1. An electrical receptacle box assembly comprising: housing means for accommodation of an electrical receptacle;
a wall stud of the type for use in building construction with a side having a plurality of mounting holes describing a hole pattern;
a mounting bracket for mounting said housing means to said wall stud;
said mounting bracket including a base having first and second opposite longitudinal ends;
means securing the housing means to the base between the longitudinal ends;
a plurality of resilient tines outwardly extended from the first and second longitudinal ends of the base opposite the housing means, each having a linear tine portion outwardly extended from the base, said linear tine portions being substantially parallel to each other, each tine at an opposite end having a flexure arm fixed to a longitudinal end of the base permitting a resilient deflection of the linear tine portion with respect to the base, said linear tine portions having outer tips arranged to describe a pattern generally corresponding to, but slightly deviant from, the hole pattern on the wall stud whereby the tines are insertable into the holes under slight spring deflection to mount the housing means to the wall stud.

2. The electrical receptacle box assembly of claim 1 wherein: said plurality of tines comprises first and second tines located on the first longitudinal end of the base, and third and fourth tines located on the second longitudinal end of the base, said tines describing a generally rectangular pattern.

3. The electrical receptacle box assembly of claim 2 wherein: said tines have transverse notches for engagement with edges of mounting holes.

4. The electrical receptacle box assembly of claim 1 wherein: each flexure arm is comprised as a spring loop.

5. The electrical receptacle box assembly of claim 1 wherein: each flexure arm is comprised as a linear resilient flexure member disposed in generally perpendicular relationship to the linear tine portion.

6. The electrical receptacle box assembly of claim 1 wherein: said tines comprise first and second tines located on the first longitudinal end of the base, and third and fourth tines located on the second longitudinal end of the base, said tines having tips describing a generally rectangular pattern.

7. The electrical receptacle box assembly of claim 6 wherein: said linear tine portions have transverse notches for engagement with edges of mounting holes.

8. The electrical receptacle box assembly of claim 6 wherein: said housing means is comprised as a box-like housing having first, second, third and fourth side walls and a back wall connected to the side walls, said base of the bracket being elongate and flat and connected to one of the housing side walls.

9. The electrical receptacle box assembly of claim 8 wherein: the plurality of tines described a pattern generally corresponding to the hole pattern on the wall stud but slightly deviant therefrom whereby said tines are insertable into said holes under slight spring tension.

10. The electrical receptacle box assembly of claim 9 wherein: said linear tine portions have transverse notches for engagement with edges of mounting holes.

11. The electrical receptacle box assembly of claim 9 wherein: each flexure arm is comprised as a spring loop.

12. The electrical receptacle box assembly of claim 11 wherein: said linear tine portions have transverse notches for engagement with edges of mounting holes.

13. The electrical receptacle box assembly of claim 6 wherein: said bracket base is elongate and flat, and housing means including first, second and third consecutive side walls and a back wall connected to the side walls, said base being connected to the first and third side walls to form a fourth side wall.

14. The electrical receptacle box assembly of claim 13 wherein: the flexure arm of each tine is comprised as a spring loop.

15. The electrical receptacle box assembly of claim 14 wherein: said linear tine portions have transverse notches for engagement with edges of mounting holes.

16. The electrical receptacle box assembly of claim 14 wherein: said base includes a first shoulder at said first longitudinal end curving toward the housing, said first and second tines having a reverse curve bending over said first shoulder forming said spring loops, a second shoulder located at the second longitudinal end of the base curving toward said housing, said third and fourth tines having reverse curve bending portions extending over the second shoulder forming said spring loops.

17. The electrical receptacle box assembly of claim 16 wherein: said first and second shoulders have portions laterally extended from the base and carrying the second and fourth tines.

18. The electrical receptacle box assembly of claim 13 wherein: each flexure arm is comprised as a linear resilient flexure member disposed in generally perpendicular relationship to the linear tine portion.

19. The electrical receptacle box assembly of claim 13 wherein: each flexure arm is comprised as a spring loop formed as an integral linear extension of the base and a U-shaped portion connected to the linear tine portion.

20. A mounting bracket assembly to mount an electrical receptacle housing comprising:
   an elongate, flat plate-like base having a first longitudinal end and a second longitudinal end and having one side adapted to be fixed to an electrical receptacle housing;
   a wall stud of the type for use in building construction with a side having a plurality of mounting holes describing a hole pattern;
   first and second tines located on the first longitudinal end of the base, each tine including a linear tine portion and a flexure arm connected at one end to the linear tine portion and at the opposite end to the base;
   third and fourth tines located on the second longitudinal end of the base, each tine including a linear tine portion and a flexure arm connected at one end to the linear tine portion and at the opposite end to the base;
   said flexure arms permitting resilient deflection of the tips of the linear tine portions, said linear tine portions being in generally parallel relationship and having outer tips arranged to describe a pattern generally corresponding to, but slightly deviant from, the hole pattern on the wall stud whereby the tines are insertable into the holes under slight spring deflection to mount an electrical receptacle housing fixed to the base to the wall stud.

21. The mounting bracket assembly of claim 20 wherein: each flexure arm is comprised as a spring loop.

22. The mounting bracket assembly of claim 21 wherein: said linear tine portions have transverse notches for engagement with the edges of mounting holes.

23. The mounting bracket assembly of claim 20 wherein: each flexure arm is comprised as a linear resilient flexure member disposed in generally perpendicular relationship to the linear tine portion of the tine.

24. The mounting bracket assembly of claim 23 wherein: said linear tine portions have transverse notches for engagement with the edges of mounting holes.

* * * * *